J. CHORZEMPA.
CUSPIDOR HOLDER.
APPLICATION FILED AUG. 6, 1917.
1,252,778.
Patented Jan. 8, 1918.
2 SHEETS—SHEET 1.
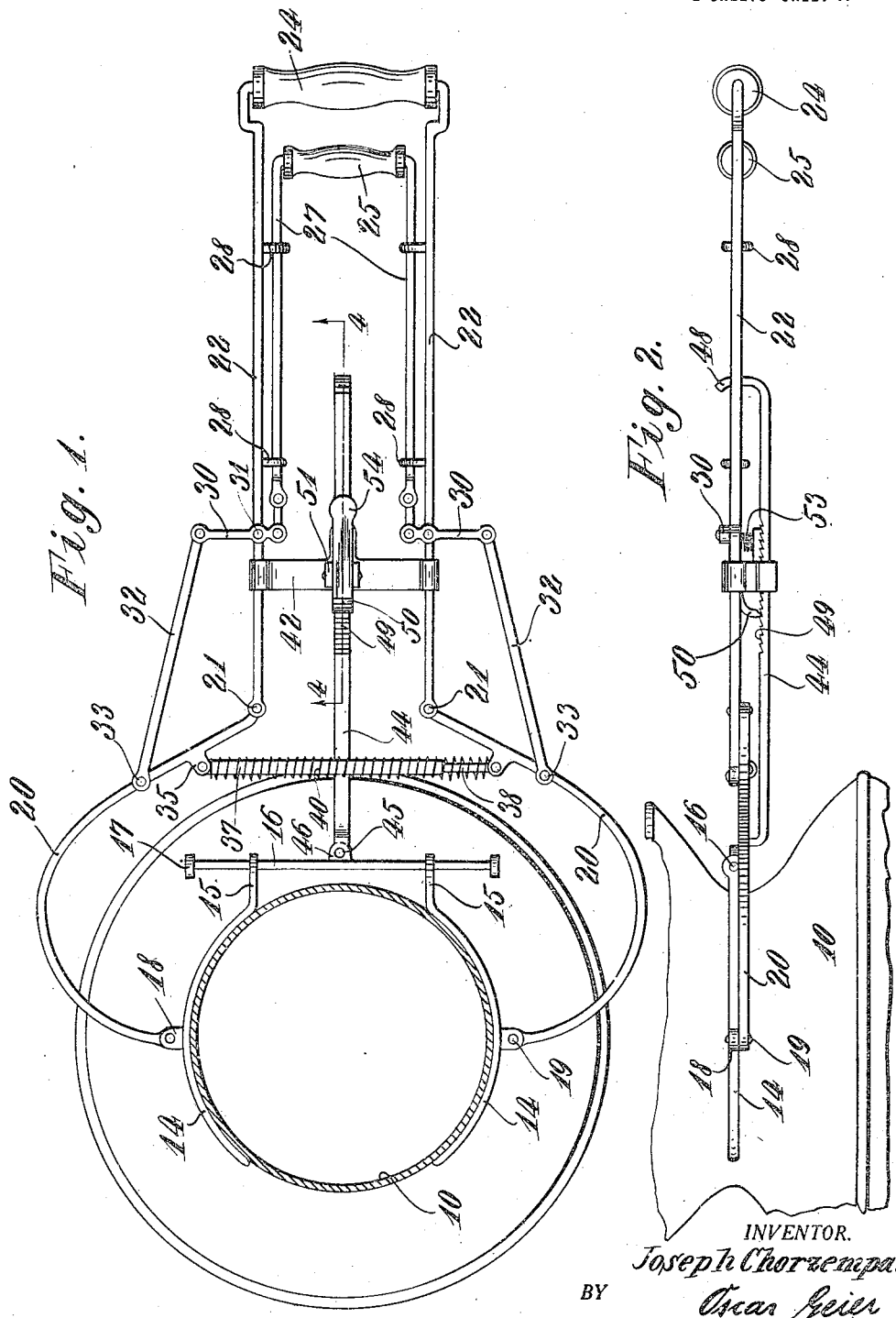
INVENTOR.
Joseph Chorzempa.
BY
Oscar Geier
HIS ATTORNEY

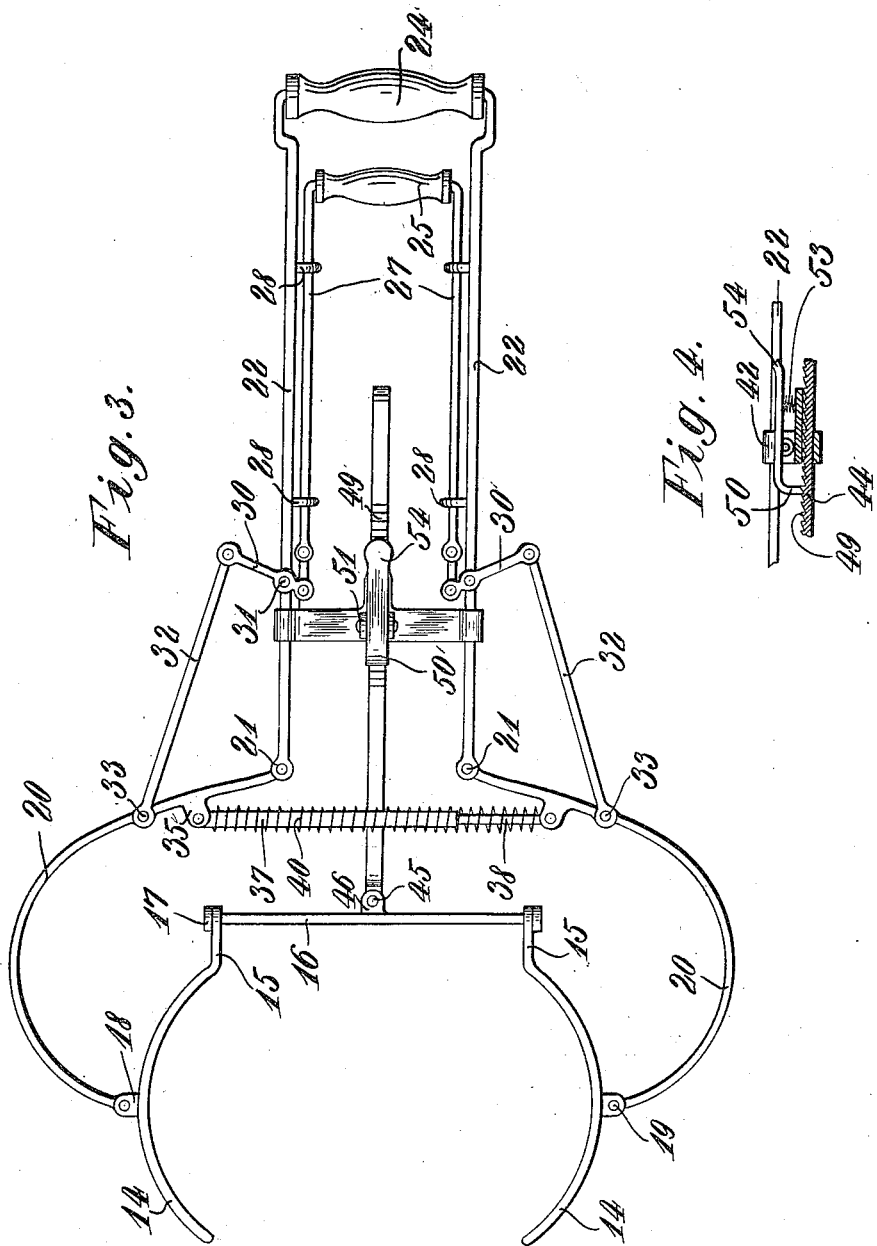

UNITED STATES PATENT OFFICE.

JOSEPH CHORZEMPA, OF CICERO, ILLINOIS.

CUSPIDOR-HOLDER.

1,252,778.  Specification of Letters Patent.  Patented Jan. 8, 1918.

Application filed August 6, 1917. Serial No. 184,626.

*To all whom it may concern:*

Be it known that I, JOSEPH CHORZEMPA, a subject of the Emperor of Austria, resident of Cicero, county of Cook, and State of Illinois, have invented certain new and useful Improvements in Cuspidor-Holders, of which the following is a specification.

This invention relates to improvements in tongs or carrying means for cuspidors and has as its special object the provision of means whereby such vessels may be securely grasped and safely transported in an easy and effective manner.

A further object is to provide such means in forms which are convenient to operate, durable in their nature, and which are suited to be upon cuspidors or like containers of a widely varying diameter.

These and other like objects are attained by the novel construction and combination of parts hereafter described and shown in the accompanying drawings, forming a material part of this disclosure, and in which—

Figure 1 is a side elevational view of an implement made in accordance with the invention, and indicating its application.

Fig. 2 is an edge view of the same.

Fig. 3 is a similar side elevational view showing the parts in another position from that of Fig. 1, and Fig. 4 is a fragmental sectional view taken on line 4—4 of Fig. 1.

Adapted to engage with a container 10 are a pair of oppositely disposed arcuate arms 14, the same having parallel rearward extensions 15, slidably engaged upon a rod 16, provided with fixed heads 17, which limit their motion, the arms 14 having fixed centrally upon their convex side outstanding lugs 18 engaged by pivot pins 19 with another pair of curved arms 20 pivoted by pins 21 at their opposite ends, to parallel disposed bars 22, engaged at their upper ends by operating handles 24, a similar but smaller handle 25 being disposed adjacent and in which are engaged rods 27, slidable through eyes 28, secured to the rods 22, and pivotally connected at their lower end with a short arm of the lever 30 pivoted at 31 upon the bars 22, the levers in turn being pivotally connected with a link 32, the opposite end of which is engaged by a pivot pin 33 with the arm 20.

Formed on these arms 20 are other lugs 35, one of which is engaged with a tubular element 37, while in the other lug is connected a rod 38, slidable in the tube 37, both of which are encircled by a push spring 40 having a tendency to separate the arms 20.

Rigidly engaged with the bars 22 below the pivotal point 31 is a connecting plate 42, suited to hold the bars in alinement and also acting as a guide and support for a longitudinally disposed bar 44, the lower end of which is pivotally engaged by the pin 45 to the lug 46 formed with the bar 16, the opposite free end 48 being upturned in the manner of a hook so as to be readily grasped and operated, while upon the inner surface of the bar 44 are formed a plurality of rack teeth 49, engageable with the hooked detent 50, pivoted by lugs 51 attached to the transverse bar 42 and held normally in engagement by means of the push spring 53 whereby the raised portion 54 of the detent is held so as to be maintained in a position relative to the rack teeth 49.

In operation, the arms 14 operate so as to encircle the vessel to be raised; the handles 24 and 25 are grasped so as to be brought together; the act of raising the handle 25 moves the bars 27, operating the lever 30, which, through the link 32, presses the arms 20 toward each other, causing the encircling arms 14 to tightly embrace opposite sides of the vessel.

At the same time, the extensions 15 of the embracing arms slide upon the rod 16, while the arms 20, pivoting on the pins 33 under action of the links and levers, moves the pivot 19 away from the handle element 25, carrying with it the rack bar 44 and is held from returning by the detent 50, thereby holding the encircling arms 14 rigidly engaged with the vessel.

When it is desired to release the same, pressure is applied to the detent knob 54, releasing the teeth of the rack, whereupon the spring 40 exerts a pressure to separate the arms 20 and through them the encircling arms 14, thus releasing the vessel.

From the foregoing it will be seen that the vessel may be rigidly engaged in such manner as to prevent its slipping by the ordinary action of grasping the handles while carrying the same, and also that releasing the vessel is easily accomplished.

Having thus described my invention, what I claim as new, and desire to secure by Letters Patent, is—

1. In a device of the class described, the combination with a pair of arcuate arms having end extensions, a rod upon which said arms are slidable, a second pair of arms upon which the first pair of arms are pivotally engaged, rods pivoted to said second pair of arms, a handle rigidly engaged with said rod, a second handle adjacent to the first named handle, bars operatively engaged with said second handle, connections with said bars and with said second arms, means for normally extending said second arms, and means operating through said second handle whereby the first named arms are caused to rigidly embrace an article.

2. In a device of the class described, the combination with a pair of arms, a bar upon which said arms are pivotally mounted, a second pair of arms pivotally engaged with the first named arms, a pair of handles adapted to be grasped simultaneously, connections between one of said handles and said second pair of arms whereby the latter are moved to or fro, a spring normally pressing said second pair of arms apart, and means for holding said second pair of arms in an adjusted position.

3. In a device of the class described, the combination with a pair of arcuate arms, a rod upon which said arms are slidably engaged, a pair of handles, connections between one of said handles and said arcuate arms, connections between the other of said handles and said arms whereby said arms may be opened or closed, means for normally opening said arms, and means for normally holding said arms in an adjusted position.

4. In a device of the class described, the combination with a pair of arcuate arms having parallel extensions, a rod upon which said extensions are slidably engaged, a frame in which said arcuate arms are pivotally carried, a pair of handles engaged with said frame, one of said handles being movable to or from the other, means combined with said movable handle for opening or closing said arcuate arms, a spring normally pressing said arms apart, a rack bar engaged with said rod, and means carried by said frame whereby said arcuate arms may be held in an adjusted position.

In testimony whereof I have affixed my signature.

JOSEPH CHORZEMPA.

Copies of this patent may be obtained for five cents each, by addressing the "Commissioner of Patents, Washington, D. C."